(12) United States Patent
Lee et al.

(10) Patent No.: US 9,534,432 B2
(45) Date of Patent: Jan. 3, 2017

(54) HINGE STRUCTURE

(71) Applicant: Acer Incorporated, New Taipei (TW)

(72) Inventors: Po-Yi Lee, New Taipei (TW);
Yi-Chang Yeh, New Taipei (TW);
Huei-Ting Chuang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/848,341

(22) Filed: Sep. 9, 2015

(65) Prior Publication Data
US 2016/0326786 A1  Nov. 10, 2016

(30) Foreign Application Priority Data
May 7, 2015  (TW) .............................. 104114566 A

(51) Int. Cl.
| | |
|---|---|
| *E05D 3/06* | (2006.01) |
| *E05D 3/18* | (2006.01) |
| *G06F 1/16* | (2006.01) |
| *E05D 3/12* | (2006.01) |
| *E05D 5/10* | (2006.01) |

(52) U.S. Cl.
CPC . *E05D 3/18* (2013.01); *E05D 3/12* (2013.01); *E05D 5/10* (2013.01); *G06F 1/1681* (2013.01); *E05D 2005/106* (2013.01)

(58) Field of Classification Search
CPC ...... Y10T 16/5387; Y10T 16/547; E05D 3/12; E05D 3/06; E05D 3/10; E05D 3/18; E05D 2005/106; G06F 1/1681; G06F 1/1616; G06F 1/1618; E05Y 2900/606; H04M 1/0216; H04M 1/0222; H04M 1/022; H05K 5/0226
See application file for complete search history.

(56) References Cited

U.S. PATENT DOCUMENTS

| | | | | |
|---|---|---|---|---|
| 4,788,746 A | * | 12/1988 | Idler ..................... | B64G 1/222 16/297 |
| 7,117,563 B2 | * | 10/2006 | Chen ..................... | G06F 1/1616 16/303 |
| 7,512,426 B2 | * | 3/2009 | Maatta ................ | H04M 1/0218 16/354 |
| 7,913,356 B2 | * | 3/2011 | Duan .................. | H04M 1/0216 16/303 |

(Continued)

FOREIGN PATENT DOCUMENTS

| | | |
|---|---|---|
| CN | 203670442 | 6/2014 |
| CN | 203717618 | 7/2014 |

(Continued)

*Primary Examiner* — Chuck Mah
(74) *Attorney, Agent, or Firm* — Jianq Chyun IP Office

(57) ABSTRACT

A hinge structure including a first shaft, a second shaft and a moving component is provided. The first shaft and the second shaft respectively have a guiding portion and a first screw thread and a second screw thread located at the guiding portion. Each of the first screw threads is connected to the corresponding second screw thread. The moving component is respectively coupled to the two guiding portions. When the first shaft and the second shaft rotate with each other through the moving component to switch between a first state and a second state, the moving component is guided by the first screw threads and the second screw threads to move along a direction parallel to the first shaft back and forth.

13 Claims, 7 Drawing Sheets

(56) References Cited

U.S. PATENT DOCUMENTS

| | | | | |
|---|---|---|---|---|
| 8,776,319 | B1* | 7/2014 | Chang | G06F 1/1681 |
| | | | | 16/303 |
| 8,959,720 | B2* | 2/2015 | Hsu | G06F 1/1681 |
| | | | | 16/303 |
| 8,966,715 | B1* | 3/2015 | Chen | H04M 1/022 |
| | | | | 16/303 |
| 8,978,209 | B1* | 3/2015 | Lin | G06F 1/1618 |
| | | | | 16/303 |
| 2014/0268533 | A1* | 9/2014 | Meyers | G06F 1/1681 |
| | | | | 361/679.27 |
| 2015/0160695 | A1* | 6/2015 | Su | E05D 3/12 |
| | | | | 16/366 |
| 2015/0173218 | A1* | 6/2015 | Hsu | E05D 3/12 |
| | | | | 16/366 |
| 2015/0189777 | A1* | 7/2015 | Hsu | H05K 5/0226 |
| | | | | 16/366 |
| 2015/0245510 | A1* | 8/2015 | Hsu | H05K 5/0226 |
| | | | | 16/250 |

FOREIGN PATENT DOCUMENTS

| | | |
|---|---|---|
| JP | 2005207465 | 8/2005 |
| TW | M447660 | 2/2013 |
| TW | 201326589 | 7/2013 |
| TW | M463968 | 10/2013 |
| TW | M463969 | 10/2013 |
| TW | M477758 | 5/2014 |
| TW | M478077 | 5/2014 |

\* cited by examiner

HINGE STRUCTURE

CROSS-REFERENCE TO RELATED APPLICATION

This application claims the priority benefit of Taiwan application serial no. 104114566, filed on May 7, 2015. The entirety of the above-mentioned patent application is hereby incorporated by reference herein and made a part of this specification.

BACKGROUND OF THE DISCLOSURE

1. Field of the Disclosure

The disclosure relates to a hinge structure. More particularly, the disclosure relates to a bi-axial hinge structure.

2. Description of Related Art

In modern times undergoing a fundamental society transformation with exploding information, portable electronic devices such as notebook computers, smart phones, tablet computers, or the like, which have the advantages of being portable and convenient for users to receive, transmit or process messages at real-time, are becoming indispensable tools in day-to-day life and work of modern people. Taking a notebook computer as an example, users may operate the notebook computer by mainly using the keyboard, touch panel or mouse, however, along with the smart phones or tablet computers are presented to the public, the operating habit of the modern people when using the portable electronic device gradually changes. Namely, the users use the fingers or styluses to touch the touch display screen of the smart phone or tablet computer, so as to command the host to execute corresponding functions. Therefore, currently, the products that the touch display screen is integrated to the notebook computer are produced, providing users operating items to operate the notebook computer via the keyboard, touch panel, mouse or touch display screen.

Generally, when the user wants to operate the notebook computer by only using the touch display screen, the user may make the first body, in which the touch display screen is disposed thereto, a 360 degrees rotation with respect to the second body, so that the back cover of the first body and the base of the second body are propped against each other. Herein in order that the first body and the second body may rotate a 360 degrees rotation, a bi-axial hinge structure is generally used to connect the first body and the second body. In conventional bi-axial hinge structure, in general, a spur gear, a bevel gear or constant pitch is disposed on the two shafts which are parallelly disposed, and a moving component (e.g., a gear or a ball bearing) is respectively coupled to the spur gear, the bevel gear or the constant pitch of the two shafts. As such, the two shafts may be synchronously rotated, achieving a 360 degrees rotation done to the first body and the second body.

Specifically, mostly, magnetic elements are disposed on the first body and the second body, and the magnetism of the magnetic element of the first body and the magnetism of the magnetic element of the second body are different. Accordingly, if the opening angle of the first body with respect to the second body is equal to 0 or 360 degrees, then the first body and the second body may be fixed via the magnetic attractive force between the abovementioned magnetic elements.

SUMMARY OF THE DISCLOSURE

The disclosure provides a hinge structure, capable that when the opening angle of the first body with respect to the second body of the electronic device is approximate to 0 or 360 degrees, the first body and the second body generate an autolock function.

The disclosure further provides a hinge structure, which includes a first shaft, a second shaft and a moving component. The second shaft is parallel to the first shaft. The first shaft and the second shaft respectively have a guiding portion and a first screw thread and a second screw thread which are located on the guiding portion. Each of the first screw threads is connected with the corresponding second screw thread. An extending direction of each of the first screw threads is parallel to an axial direction of the corresponding first shaft or second shaft. An extending direction of each of the second screw threads is inclined to the axial direction of the corresponding first shaft or second shaft. The moving component is coupled to the two guiding portions. When the first shaft and the second shaft relatively rotate with each other through the moving component to switch between a first state and a second state, the moving component is adapted to be guided by the first screw threads and the second screw threads so as to move back and forth in a direction parallel to the first shaft. In the first state, the moving component respectively coupled to the second screw thread of the first shaft and the first screw thread of the second shaft. In the second state, the moving component respectively coupled to the first screw thread of the first shaft and the second screw thread of the second shaft.

In light of the above, the first shaft and the second shaft of the hinge structure of the disclosure may relatively rotate through the moving component coupled to therebetween. In detailed, the moving component may respectively be coupled to the variable pitch screws located on the peripheral surface of the two guiding portions of the first and the second shaft, through the variable pitch screw design, the hinge structure is capable that when the opening angle of the first body with respect to the second body of the electronic device is approximate to 0 or 360 degrees, the first body and the second body generate an autolock function.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
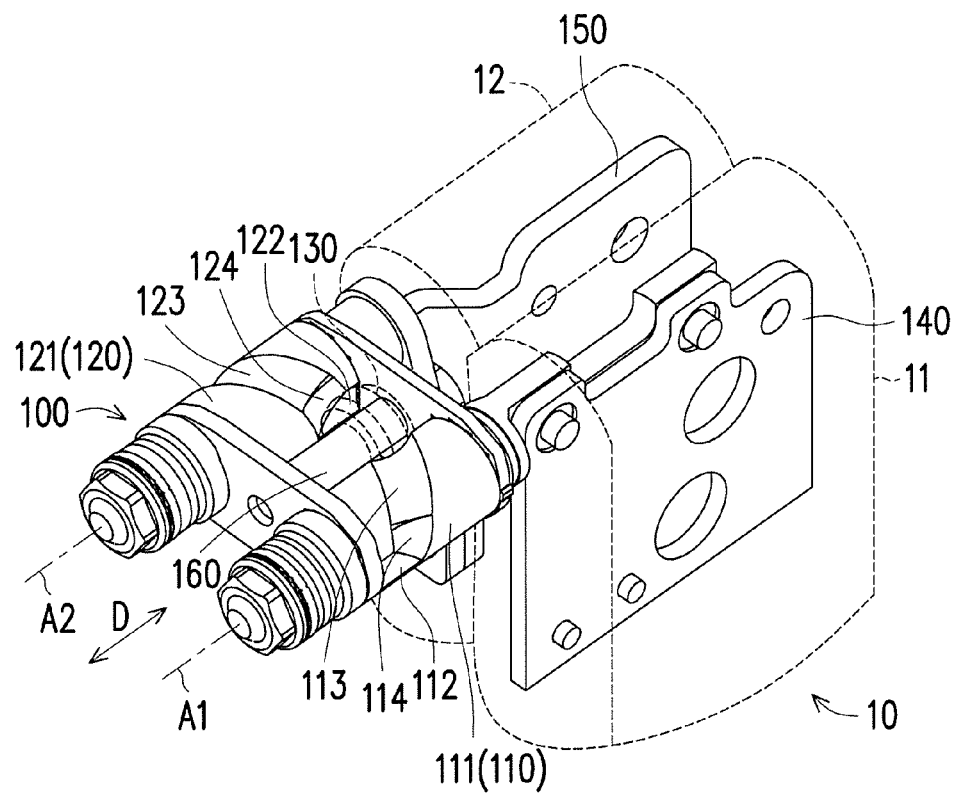
FIG. 1 through FIG. 7 are schematic views showing the acting of a hinge structure according to one exemplary embodiment of the disclosure.
Figure 1:
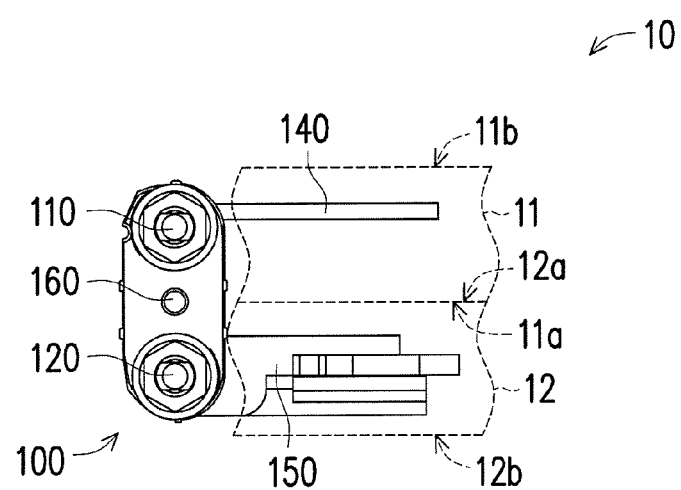
Figure 5:
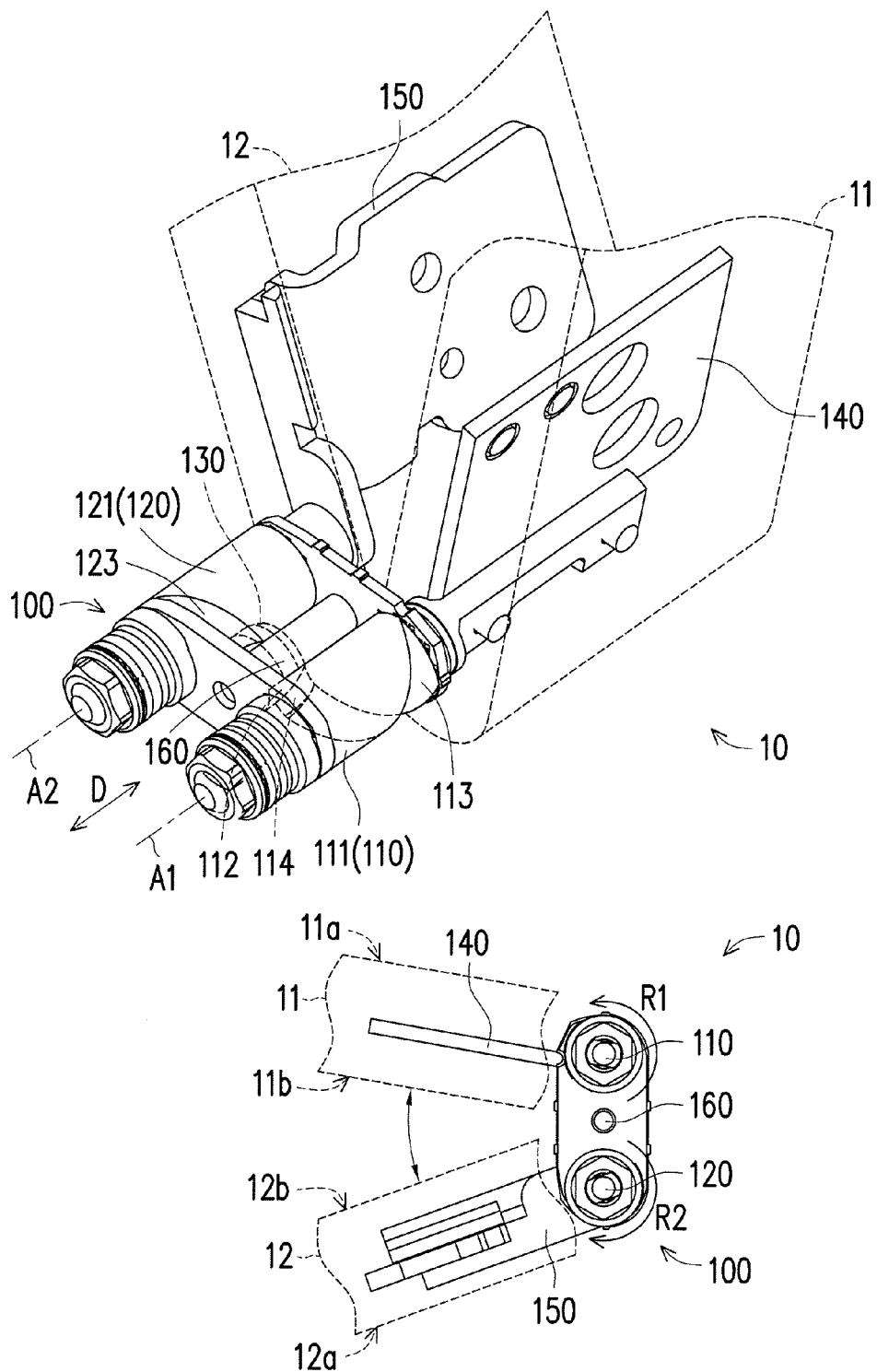
Figure 6:
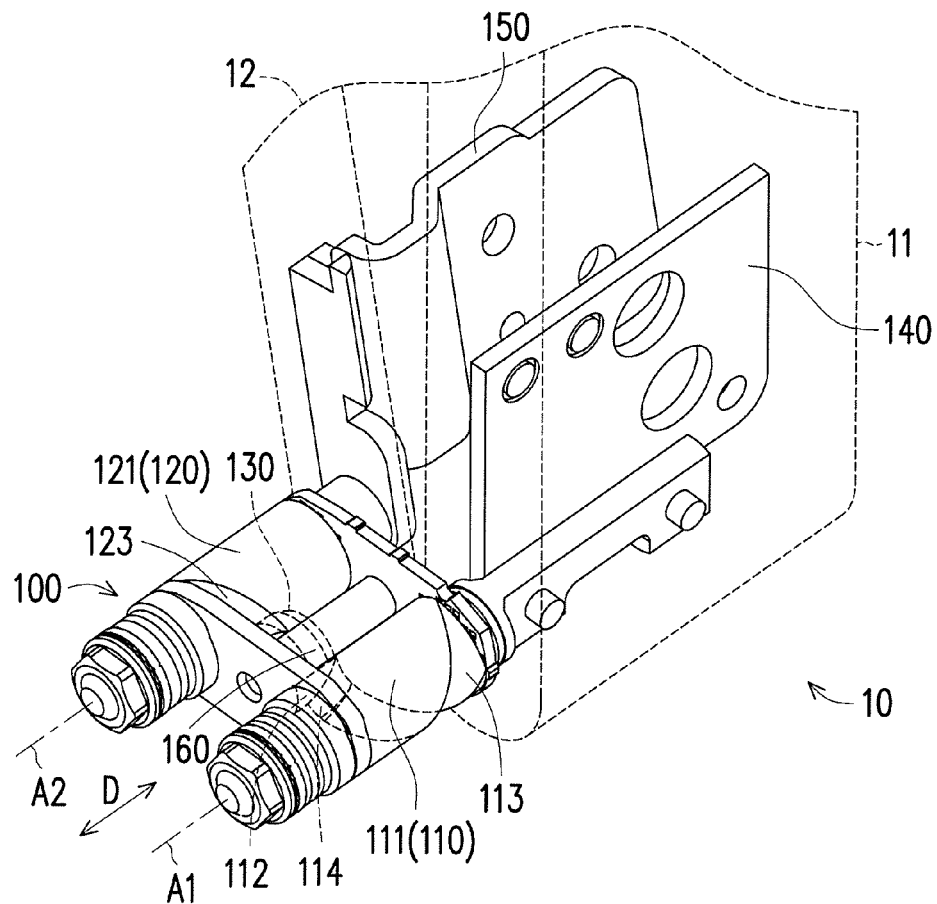
Figure 6:
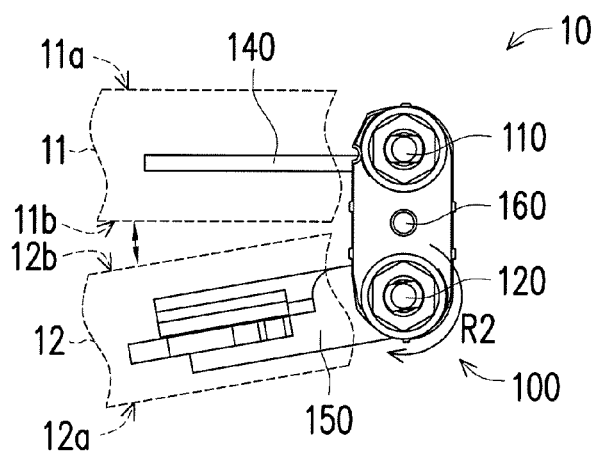
Figure 7:
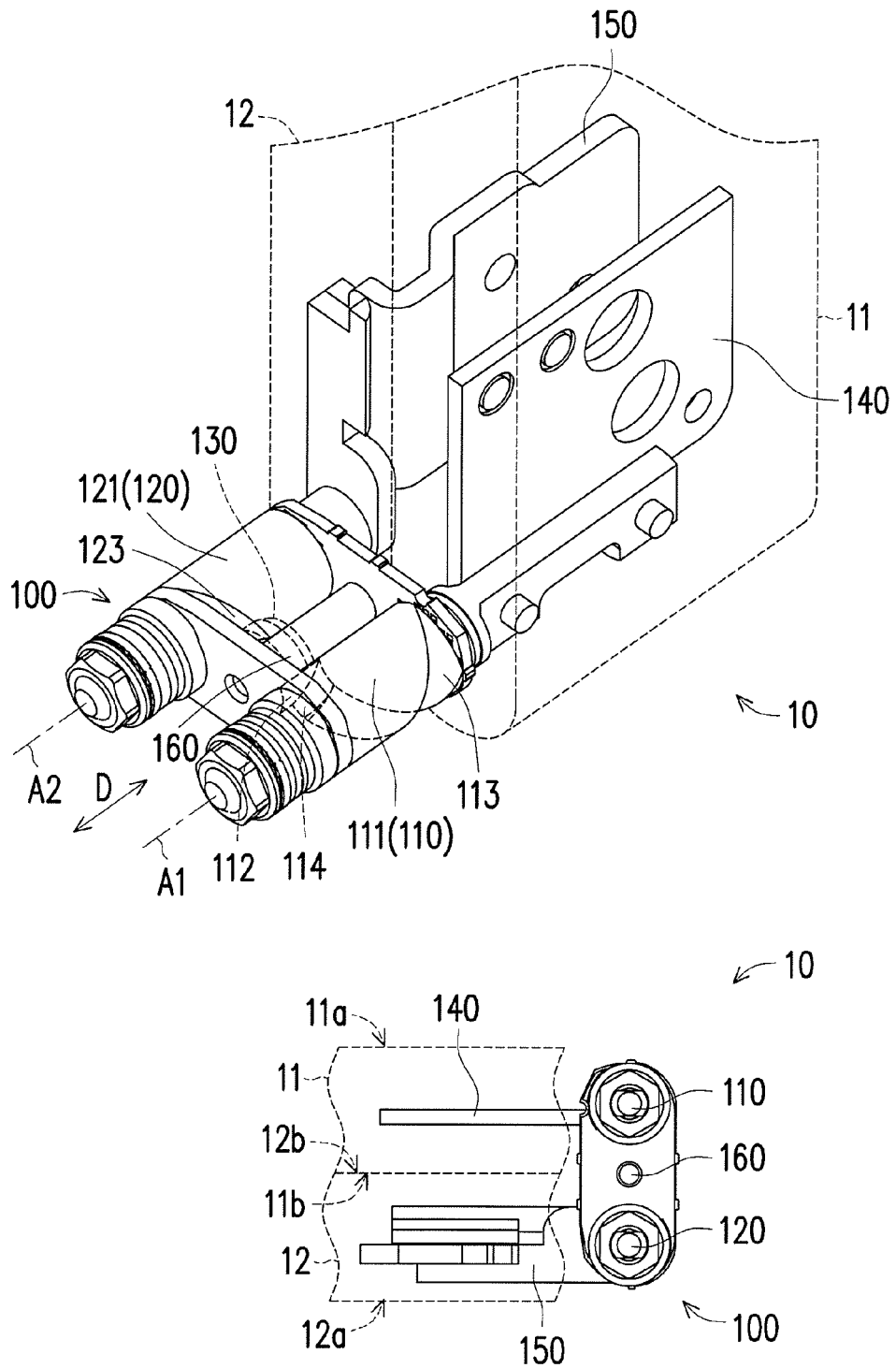

FIG. 1 through FIG. 7 are schematic views of acting of a hinge structure according to one exemplary embodiment of the disclosure. FIG. 1 through FIG. 7 respectively show exploded views and corresponding side views of each state of the hinge structure. The hinge structure 100 shown in FIG. 1 is in the first state, and the hinge structure 100 shown in FIG. 7 is in the second state. Referring to FIG. 1, in the embodiment, the hinge structure 100 is suitable for an electronic device 10. The electronic device 10 is, for example, a notebook computer, which has a first body 11 and a second body 12. The first body 11 may be a display screen with a touch control function or a display screen without a touch control function. The hinge structure 100 connects the first body 11 and the second body 12, such that the first body 11 and the second body 12 may relatively rotate through the action of the hinge structure 100. Herein the first body 11 and the second body 12 may perform a 360 degrees rotation through the action of the hinge structure 100.

The hinge structure 100 includes a first shaft 110, a second shaft 120 and a moving component 130. The first shaft 110 and the second shaft 120 are parallel to each other. The first shaft 110 has a guiding portion 111, a first screw thread 112 and a second screw thread 113 connected to the first screw thread 112 which are located on the guiding portion 111. The extending direction of the first screw thread 112 is parallel to the axial direction A1 of the first shaft 110. The extending direction of the second screw thread 113 is inclined to the axial direction A1 of the first shaft 110. Herein the second shaft 120 has a structure similar to the first shaft 110. Namely, the second shaft 120 also has a guiding portion 121 as corresponding to the guiding portion 111, a first screw thread 122 and a second screw thread 123 connected to the first screw thread 122 which are located on the guiding portion 121. The extending direction of the first screw thread 122 is parallel to the axial direction A2 of the second shaft 120. The extending direction of the second screw thread 123 is inclined to the axial direction A2 of the second shaft 120. Namely, the extending directions of the first screw threads 112 and 122 are parallel to each other, and the helix angles of the first screw threads 112 and 122 are both 0 degree, for example. On the other hand, the helix angles of the second screw threads 113 and 123 are equal to each other, and equal to 30 degrees, for example.

In the embodiment, the first shaft 110 further has a third screw thread 114 located on the guiding portion 111. The third screw thread 114 is connected with the first screw thread 112 and the second screw thread 113. Similarly, the second shaft 120 further has a third screw thread 124 located on the guiding portion 121. The third screw thread 124 is connected with the first screw thread 122 and the second screw thread 123. In detailed, the extending direction of each of the third screw threads 114 is inclined to the axial direction A1 of the corresponding first shaft 110, and the extending direction of each of the third screw threads 124 is inclined to the axial direction A2 of the second shaft 120. The helix angles of the third screw threads 114 and 124 are equal to each other, and equal to 20 degrees, for example. Namely, the helix angle of the second screw thread 113 may be greater than the helix angle of the third screw thread 114, and the third helix angle of the third screw thread 114 is greater than the helix angle of the first screw thread 112, for example. Also as for the screw thread structure formed on the guiding portion 121 of the second shaft 120, the helix angle of the second screw thread 123 may be greater than the helix angle of the third screw thread 124, and the third helix angle of the third screw thread 124 is greater than the helix angle of the first screw thread 122, for example. Therefore, the sequential and continuous first screw thread 112, third screw thread 114 and second screw thread 113 are the variable pitch screws formed on the peripheral surface of the guiding portion 111 of the first shaft 110. Similarly, the sequential and continuous first screw thread 122, third screw thread 124 and second screw thread 123 are the variable pitch screws formed on the peripheral surface of the guiding portion 121 of the second shaft 120.

Referring to FIG. 1, the hinge structure 100 further includes a first frame body 140 connected with the first shaft 110 and a second frame body 150 connected with the second shaft 120. The first frame body 140 and the second frame body 150 are located at the same side of the first shaft 110 or the second shaft 120, for example. In the embodiment, the second screw thread 113 formed on the guiding portion 111 of the first shaft 110 is nearer to the first frame body 140 than the third screw thread 114 and the first screw thread 112, for example, and the third screw thread 114 is located between the second screw thread 113 and the first screw thread 112. On the other hand, the first screw thread 122 formed on the guiding portion 121 of the second shaft 120 is nearer to the second frame body 150 than the third screw thread 124 and the second screw thread 123, for example, and the third screw thread 124 is located between the first screw thread 122 and the second screw thread 123.

In detailed, the first shaft 110 may be connected with the first body 11 via the first frame body 140, and the second shaft 120 may be connected with the second body 12 via the second frame body 150. The opening angle of the first frame body 140 with respect to the second frame body 150 is adapted to change with the relative rotation between the first shaft 110 and the second shaft 120 through the moving component 130. When in the first state as shown in FIG. 1, the opening angle of the first frame body 140 with respect to the second frame body 150 is 0 degree, for example. At this time, the opening angle of the first body 11 with respect to the second body 12 is also 0 degree, for example, and the work surface 11a of the first body 11 faces the work surface 12a of the second body 12.

The moving component 130 is a ball bearing respectively coupled to the guiding portions 111 and 121, for example. As shown in FIG. 1, the hinge structure 100 further includes a guide shaft 160. The guide shaft 160 is parallel to the first shaft 110 and located between the first shaft 110 and the second shaft 120. The moving component 130 is movably disposed on the guide shaft 160, wherein the guide shaft 160 passes through the moving component 130, for example. When the first shaft 110 and the second shaft 120 relatively rotate with each other through the moving component 130 to switch between the first state shown in FIG. 1 and the second state shown in FIG. 7, the moving component 130 may be guided by the first screw threads 112 and 122, the second screw threads 113 and 123 and the third screw threads 114 and 124 so as to move back and forth along the guide shaft 160 (i.e., the direction D parallel to the first shaft 110).

Figure 2:
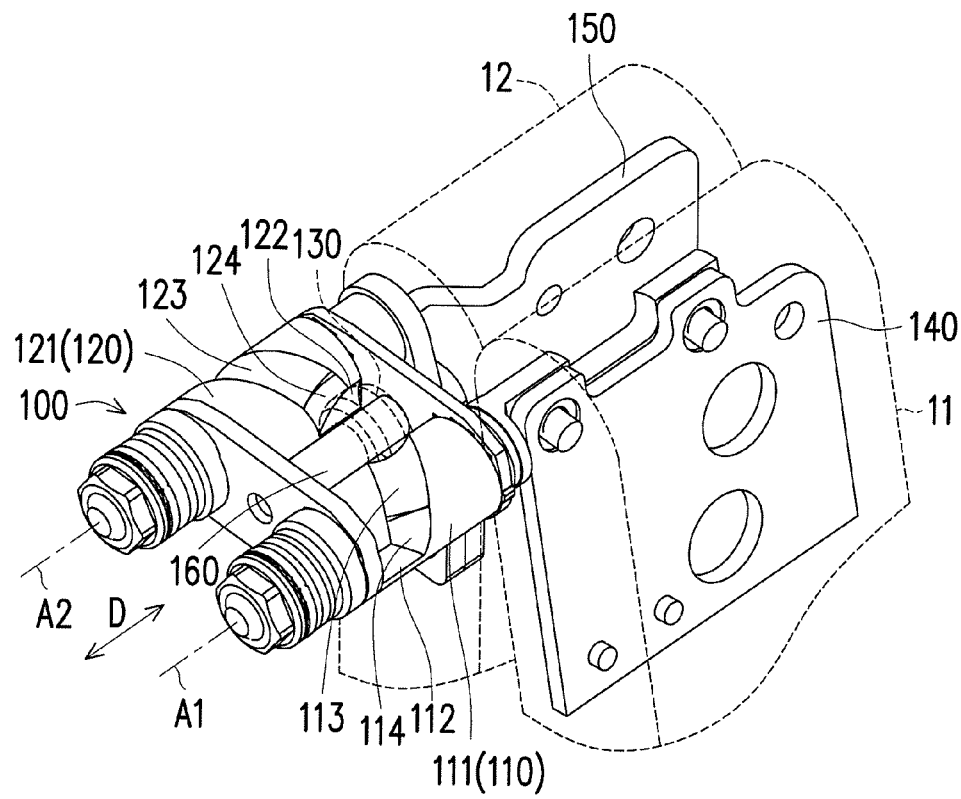
Figure 2:
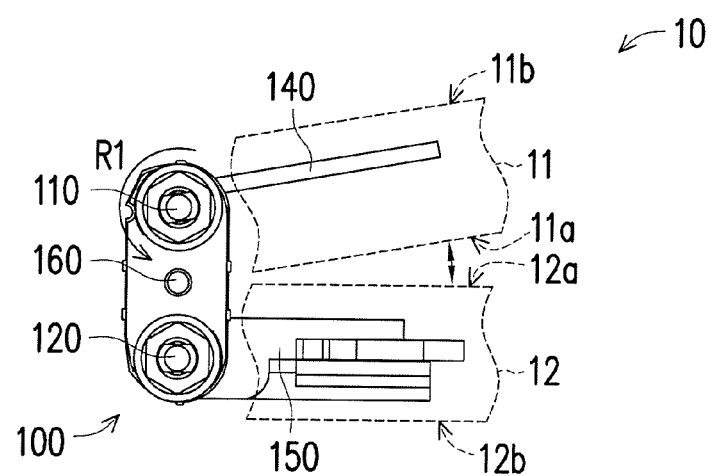
Figure 3:
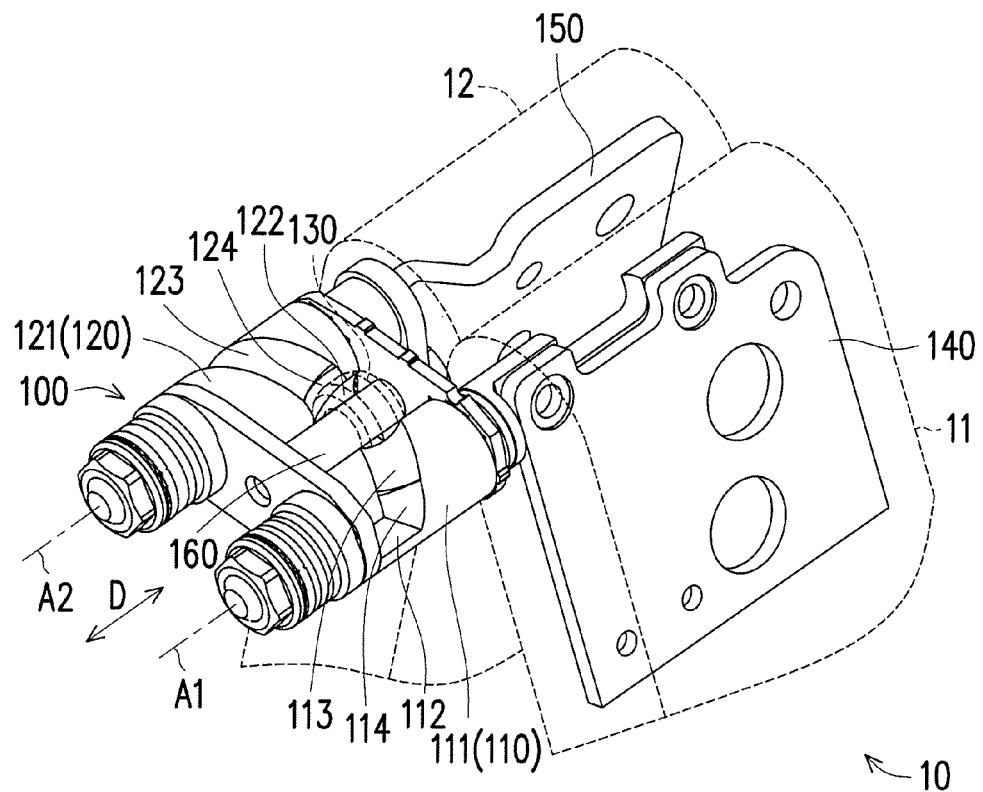
Figure 3:
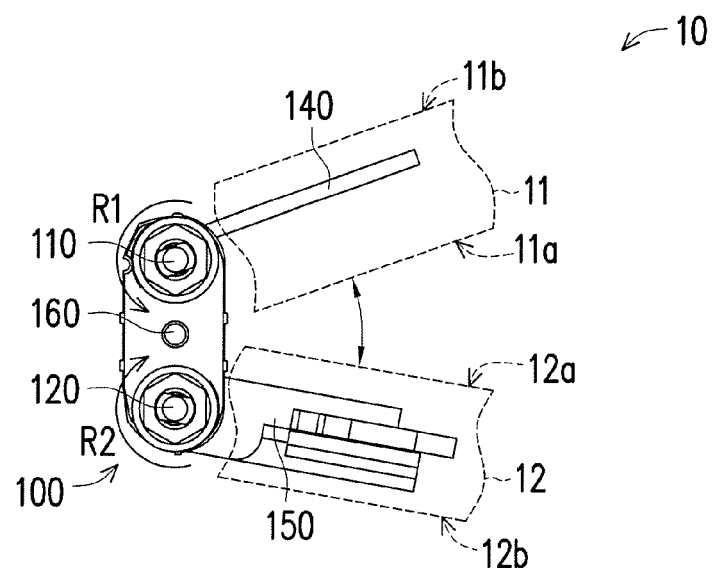

In the first state as shown in FIG. 1, the moving component 130 is relatively nearer to the first frame body 140 or the second frame body 150, and respectively coupled to the second screw thread 113 of the first shaft 110 and the first screw thread 122 of the second shaft 120. Then, make the first shaft 110 and the second shaft 120 to relatively rotate through the moving component 130, the moving component 130, via the guide of the second screw thread 113, may move in a direction away from the first frame body 140 or the second frame body 150 along the first screw thread 122. At this time, the second shaft 120 may be unmoved, and the first shaft 110 may rotate in the first rotation direction R1, as shown in FIG. 2. Next, continuously the first shaft 110 and the second shaft 120 are relatively rotated through the moving component 130, the moving component 130 may move from the first screw thread 122 to the third screw thread 124, until the moving component 130 is moved from the first screw thread 122 to the third screw thread 124 of the second shaft 120, the second shaft 120 may then rotate in the second rotation direction R2 which is opposite to the first rotation direction R1. As shown in FIG. 3, the moving component 130 is respectively coupled to the second screw thread 113 of the first shaft 110 and the third screw thread 124 of the second shaft 120.

The purpose of disposing the third screw thread 124 between the first screw thread 122 and the second screw thread 123 is for compensating the rotation angle of the second shaft 120, through which when the first shaft 110 rotates in the first rotation direction R1 and the rotation angle reaches 90 degrees, the rotation angle of the second shaft 120 rotating in the second rotation direction R2 may also synchronously reach 90 degrees. For instance, the rotation angle of the first shaft 110 rotating in the first rotation direction R1 and the rotation angle of the second shaft rotating in the second rotation direction R2 reach an identical numerical range such as a range between 20 and 90 degrees.

Figure 4:
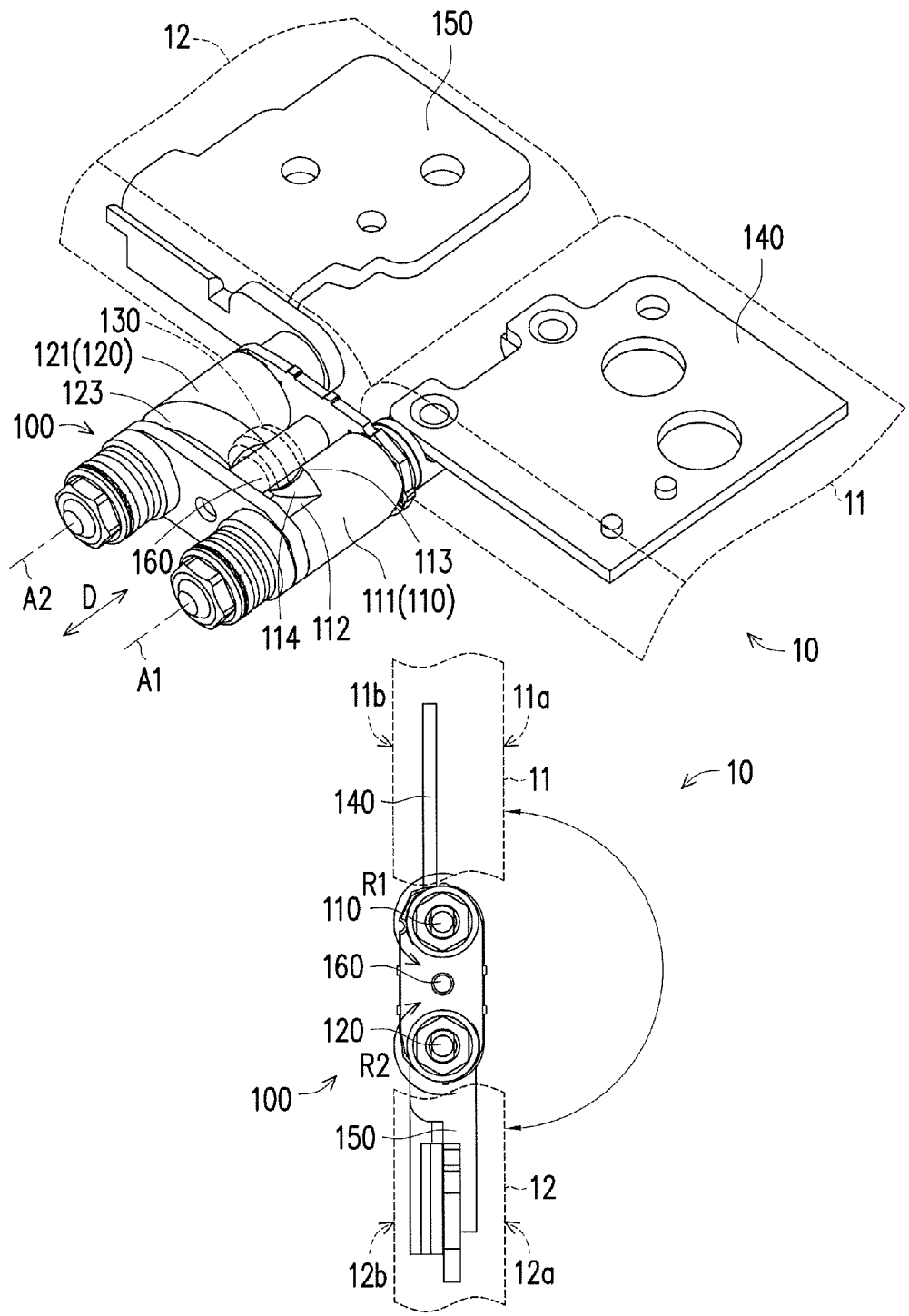

Next, the first shaft 110 and the second shaft 120 are continuously relatively rotated through the moving component 130. At this time, the first shaft 110 may rotate in the first rotation direction R1, and the second shaft 120 may rotate in the second rotation direction R2. On the other hand, under the driving of the guiding portions 111 and 121, the moving component 130 may be coupled to the second screw thread 113, and move from the third screw thread 124 to the second screw thread 123. As shown in FIG. 4, after the first shaft 110 rotates 90 degrees in the first rotation direction R1 and the second shaft 120 rotates 90 degrees in the second rotation direction R2, the opening angle of the first frame body 140 with respect to the second frame body 150 may be equal to 180 degrees, such that the back surface 11b of the first body 11 (i.e., a surface opposite to the work surface 11a) and the back surface 12b of the second body 12 (i.e., a surface of the work surface 12a) may be coplanar. On the other hand, the moving component 130 is respectively coupled to the second screw thread 113 of the first shaft 110 and the second screw thread 123 of the second shaft 120.

As shown in FIG. 5, the first shaft 110 and the second shaft 120 are continuously relatively rotated through the moving component 130. Under the driving of the guiding portions 111 and 121, the moving component 130 may move from the second screw thread 113 to the third screw thread 114 and coupled to the second screw thread 123. At this time, the opening angle of the first frame body 140 with respect to the second frame body 150 is greater than 315 degrees (or saying that the opening angle of the back surface 11b of the first body 11 with respect to the back surface 12b of the second body 12 is smaller than 45 degrees) for example, preferably greater than 340 degrees (or saying that the opening angle of the back surface 11b of the first body 11 with respect to the back surface 12b of the second body 12 is smaller than 20 degrees).

As shown in FIG. 6 and FIG. 7, the moving component 130 which moves in a direction away from the first frame body 140 or the second frame body 150 may be continuously coupled to the second screw thread 123, and move from the third screw thread 114 to the first screw thread 112. When the moving component 130 is coupled to the second screw thread 123 and after moves from the third screw thread 114 to the first screw thread 112, the first shaft 110 may be unmoved and the second shaft 120 may continuously rotate in the second rotation direction R2. Continuously rotating of the second shaft 120 in the second rotation direction R2 may drive the second frame 150 to move relative to the first frame body 140, so that when the opening angle of the first frame body 140 (or the first body 11) with respect to the second frame body 150 (or the second body 12) is approximate to 360 degrees (or saying that the opening angle of the back surface 11b of the first body 11 with respect to the back surface 12b of the second body 12 is approximate to 0 degree), the first frame body 140 (or the first body 11) and the second frame body 150 (or the second body 12) may generate an autolock function.

After the first frame body 140 (or the first body 11) and the second frame body 150 (or the second body 12) are autolocked (i.e., the second state as shown in FIG. 7), the opening angle of the first frame body 140 with respect to the second frame body 150 is 360 degrees (or saying that the opening angle of the back surface 11b of the first body 11 with respect to the back surface 12b of the second body 12 is equal to 0 degree), for example. At this time, the opening angle of the first body 11 with respect to the second body 12 is also 360 degree, for example, and the back surface 11b of the first body 11 faces the back surface 12b of the second body 12.

On the other hand, the action that the hinge structure 100 in the second state as shown in FIG. 7 is returned to the hinge structure 100 in the first state as shown in FIG. 1 is substantially similar to the abovementioned embodiment, and the following only describes the difference therebetween. Before the hinge structure 100 in the second state as shown in FIG. 7 is returned to the hinge structure 100 in the first state as shown in FIG. 1, the moving component 130 may move in a direction toward the first frame body 140 or the second frame body 150, and the moving component 130 may sequentially respectively be coupled to the third screw thread 114 of the first shaft 110 and the second screw thread 123 of the second shaft 120, coupled to the second screw thread 113 of the first shaft 110 and the second screw thread 123 of the second shaft 120, and coupled to the second screw thread 113 of the first shaft 110 and the third screw thread 124 of the second shaft 120. When the moving component 130 is respectively coupled to the second screw thread 113 of the first shaft 110 and the third screw thread 124 of the second shaft 120, the opening angle of the first frame body 140 with respect to the second frame body 150 is smaller than 45 degrees, preferably smaller than 20 degrees, for example.

In detailed, the moving component 130 which moves in a direction near to the first frame body 140 or the second frame body 150 may be continuously coupled to the second screw thread 113, and move from the third screw thread 124 to the first screw thread 122. When the moving component 130 is coupled to the second screw thread 113 and after moves from the third screw thread 124 to the first screw thread 122, the second shaft 120 may be unmoved and the first shaft 110 may continuously rotate in a direction opposite to the first rotation direction R1. Continuously rotating of the first shaft 110 in the direction opposite to the first rotation direction R1 may drive the first frame 140 to move relative to the second frame body 140, so that when the opening angle of the first frame body 150 (or the first body 11) with respect to the second frame body 150 (or the second body 12) is approximate to 0 degree, the first frame body 140 (or the first body 11) and the second frame body 150 (or the second body 12) may generate an autolock function and is further returned back to the first state as shown in FIG. 1.

In light of the foregoing, the first shaft and the second shaft of the hinge structure of the disclosure may relatively rotate through the moving component coupled to therebetween. In detailed, the moving component may respectively be coupled to the variable pitch screws located on the peripheral surface of the two guiding portions of the first and the second shaft, through the variable pitch screw design, the hinge structure is capable that when the opening angle of the first body with respect to the second body of the electronic device is approximate to 0 or 360 degrees, the first body and the second body generate an autolock function. Compared to the conventional technique, in which magnetic elements having different magnetism are respectively disposed on the first body and the second body so that the first body and the second body are fixed by using the magnetic attractive force between the magnetic elements when the opening angle of the first body with respect to the second body is equal 0 or 360 degrees, the electronic device which uses the hinge structure of the disclosure may facilitate reducing the manufacturing cost since no extra magnetic element as mentioned above is required to be disposed.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A hinge structure, comprising:
    a first shaft;
    a second shaft, parallel to the first shaft, wherein the first shaft and the second shaft respectively have a guiding portion and a first screw thread and a second screw thread which are located on the guiding portion, each of the first screw threads is connected with the corresponding second screw thread, an extending direction of each of the first screw threads is parallel to an axial direction of the corresponding first shaft or second shaft, and an extending direction of each of the second screw threads is inclined to the axial direction of the corresponding first shaft or second shaft; and
    a moving component, coupled to the two guiding portions, wherein when the first shaft and the second shaft relatively rotate with each other through the moving component to switch between a first state and a second state, the moving component is adapted to be guided by the first screw threads and the second screw threads so as to move back and forth in a direction parallel to the first shaft;
    in the first state, the moving component respectively coupled to the second screw thread of the first shaft and the first screw thread of the second shaft;
    in the second state, the moving component respectively coupled to the first screw thread of the first shaft and the second screw thread of the second shaft.

2. The hinge structure as claimed in claim 1, wherein a helix angle of each of the first screw threads is smaller than a helix angle of the corresponding second screw thread.

3. The hinge structure as claimed in claim 1, wherein a helix angle of each of the first screw threads is equal to 0 degree.

4. The hinge structure as claimed in claim 1, wherein the first shaft and the second shaft respectively further have a third screw thread located on the guiding portion, each of the third screw threads is connected with the corresponding first screw thread and second screw thread, when the first shaft and the second shaft relatively rotate with each other through the moving component to switch between the first state and the second state, the moving component is adapted to be guided by the first screw threads, the second screw threads and the third screw threads so as to move back and forth in the direction parallel to the first shaft.

5. The hinge structure as claimed in claim 4, wherein an extending direction of each of the third screw threads is inclined to the axial direction of the corresponding first shaft or second shaft.

6. The hinge structure as claimed in claim 4, wherein the helix angle of each of the second screw threads is greater than a helix angle of the corresponding third screw thread, and the helix angle of each of the third screw threads is greater than the helix angle of corresponding first screw thread.

7. The hinge structure as claimed in claim 4, wherein between the first state and the second state, the moving component is sequentially respectively coupled to the second screw thread of the first shaft and the third screw thread of the second shaft, coupled to the second screw thread of the first shaft and the second screw thread of the second shaft, and coupled to the third screw thread of the first shaft and the second screw thread of the second shaft.

8. The hinge structure as claimed in claim 7, wherein when the moving component is coupled to the second screw thread of the first shaft and before moves from the first screw thread to the third screw thread of the second shaft, the second shaft is unmoved and the first shaft rotates in a first rotation direction.

9. The hinge structure as claimed in claim 7, wherein when the moving component is coupled to the second screw thread of the second shaft and before moves from the third screw thread to the first screw thread of the first shaft, the first shaft is unmoved and the second shaft rotates in a second rotation direction.

10. The hinge structure as claimed in claim 1, further comprising:
    a guide shaft, parallel to the first shaft and located between the first shaft and the second shaft, wherein the moving component is movably disposed on the guide shaft.

11. The hinge structure as claimed in claim 1, further comprising:
    a first frame body, connected to the first shaft; and
    a second frame body, connected to the second shaft, wherein an opening angle of the first frame body with respect to the second frame body is adapted to change with a relative rotation between the first shaft and the second shaft through the moving component.

12. The hinge structure as claimed in claim 11, wherein the hinge structure is suitable for an electronic device, the electronic device comprises a first body and a second body, the first body and the second body respectively have a work surface and a back surface opposite to the work surface, the first frame body is connected with the first body, and the second frame body is connected with the second body;
    in the first state, the opening angle is equal to 0 degree, and the two work surfaces of the first body and the second body face each other;
    in the second state, the opening angle is equal to 360 degrees, and the two back surfaces of the first body and the second body face each other.

13. The hinge structure as claimed in claim 12, wherein when the opening angle is equal to 180 degrees, the two back surfaces of the first body and the second body are coplanar.

* * * * *